US012154730B2

(12) United States Patent
Wu et al.

(10) Patent No.: US 12,154,730 B2
(45) Date of Patent: Nov. 26, 2024

(54) COMBINED MUTE SWITCH

(71) Applicant: DONGGUAN CITY KAIHUA ELECTRONICS CO.LTD, Guangdong (CN)

(72) Inventors: Fuxi Wu, Guangdong (CN); Qiancheng Hu, Guangdong (CN)

( * ) Notice: Subject to any disclaimer, the term of this patent is extended or adjusted under 35 U.S.C. 154(b) by 99 days.

(21) Appl. No.: 17/927,860

(22) PCT Filed: Jun. 29, 2021

(86) PCT No.: PCT/CN2021/103030

§ 371 (c)(1),
(2) Date: Nov. 25, 2022

(87) PCT Pub. No.: WO2021/239158

PCT Pub. Date: Dec. 2, 2021

(65) Prior Publication Data

US 2023/0207233 A1 Jun. 29, 2023

(30) Foreign Application Priority Data

May 29, 2020 (CN) ........................ 202020958129.4

(51) Int. Cl.
*H01H 13/20* (2006.01)
*H01H 13/14* (2006.01)
(Continued)

(52) U.S. Cl.
CPC ............ *H01H 13/20* (2013.01); *H01H 13/14* (2013.01); *H01H 13/28* (2013.01); *H01H 13/52* (2013.01);
(Continued)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS

2023/0290584 A1* 9/2023 Wu ........................ H01H 13/28

FOREIGN PATENT DOCUMENTS

CN 205282348 U 6/2016
CN 207116290 U * 3/2018
(Continued)

OTHER PUBLICATIONS

International search report of PCT/CN2021/103030.

*Primary Examiner* — Ahmed M Saeed

(57) ABSTRACT

The present utility model discloses a combined mute switch comprising a base and an upper cover arranged above the base, an accommodating cavity being formed in the combination of the upper cover and the base, a guide core being arranged in the accommodating cavity; at least one upper elastically deformable silencing member is arranged on the upper cover and on the top wall of the accommodating cavity; at least one lower elastically deformable silencing member is arranged on a lower end of the guide core; an impact force of the guide core moving downwards is damped and silenced by the lower elastically deformable silencing member; and an impact force of the guide core moving upwards to be reset is damped and silenced by the upper elastically deformable silencing member. The combined mute switch provided by the present utility model achieves a mute effect when being pressed and popped to reset.

9 Claims, 5 Drawing Sheets

(51) Int. Cl.
*H01H 13/28* (2006.01)
*H01H 13/52* (2006.01)
*H01H 13/10* (2006.01)

(52) U.S. Cl.
CPC ....... *H01H 13/10* (2013.01); *H01H 2203/036* (2013.01)

(58) Field of Classification Search
CPC ............. H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

FOREIGN PATENT DOCUMENTS

| | | | | | |
|---|---|---|---|---|---|
| CN | 208014594 | U | * | 10/2018 | |
| CN | 208548289 | U | | 2/2019 | |
| CN | 212485172 | U | | 2/2021 | |
| FR | 2993700 | A1 | * | 1/2014 | ............. H01H 13/52 |
| JP | H04331539 | A | | 11/1992 | |

* cited by examiner

COMBINED MUTE SWITCH

TECHNICAL FIELD

The utility model relates to a key switch, in, particular to a combined mute switch.

BACKGROUND ART

When a key switch is used, since the press shaft of the key will touch the base and the popped shaft will touch the upper cover, it is easy to make noises during the pressing and releasing.

In order to achieve silencing of the key switch, it is common practice to add a resilient pad or washer under the key to create a cushion to reduce the key tones. In this structure mode, the silence can only be realized when the key is pressed. After the key is popped up, the sound will still be generated when the shaft hits the top of the upper cover, and the silence cannot be completely realized.

SUMMARY OF THE UTILITY MODEL

In view of the above-mentioned deficiencies, the object of the present utility model is to provide a combined mute switch which achieves a mute effect when being pressed and popped to reset.

The technical solution adopted by the utility model for achieving the above purpose is as follows.

A combined mute switch comprises a base and an upper cover arranged above the base, an accommodating cavity being formed in the combination of the upper cover and the base, a guide core being arranged in the accommodating cavity, characterized in that at least one upper elastically deformable silencing member is arranged on the upper cover and on the top wall of the accommodating cavity; at least one lower elastically deformable silencing member is arranged on a lower end of the guide core; an impact force of the guide core moving downwards is damped and silenced by the lower elastically deformable silencing member; and an impact force of the guide core moving upwards to be reset is damped and silenced by the upper elastically deformable silencing member.

As a further improvement of the present utility model, in a natural state, the guide core is in contact with the upper elastically deformable silencing member; and in a working state, the lower elastically deformable silencing member is in contact with a bottom wall of the accommodating cavity.

As a further improvement of the present utility model, the upper elastically deformable silencing member is integrally injection-molded on the upper cover.

As a further improvement of the present utility model, the upper elastically deformable silencing member is adhered to the upper cover.

As a further improvement of the present utility model, a clamp slot is formed on the upper cover; and the upper elastically deformable silencing member is arranged in the clamp slot.

As a further improvement of the present utility model, the upper elastically deformable silencing members has the number of two on opposite sides.

As a further improvement of the present utility model, a chamber is reserved in the guide core; a mute buffer is integrally injection-molded in the chamber; and the mute buffer is exposed from the lower end of the guide core to form the lower elastically deformable silencing member.

As a further improvement of the present utility model, the mute buffer is mainly composed of a central ferrule, two mute bars oppositely connected to both sides of the central ferrule, and two lower elastically deformable silencing members respectively connected to lower ends of the two mute bars.

As a further improvement of the present utility model, a guide post protrudes upwards on the base, and a guide hole is formed in the direction of the central axis of the guide post; the lower end of the guide core extends downwards and is provided with a plug shaft inserted into the guide hole; the central ferrule surrounds the periphery of the plug shaft; a return spring is sheathed on the periphery of the plug shaft; and the upper end of the return spring contacts the central ferrule.

As a further improvement of the present utility model, the lower elastically deformable silencing member is adhered or clamped to the lower end of the guide core.

As a further improvement of the present utility model, the upper and lower elastically deformable silencing members are both flexible glue.

Beneficial effects of the utility model. In the combination, the upper cover is provided with the upper elastically deformable silencing member and the lower elastically deformable silencing member is provided at the lower end of the guide core. When the guide core is pressed to the working state, the lower elastically deformable silencing member at the lower end of the guide core touches the bottom wall (base) of the accommodating cavity, and the lower elastically deformable silencing member cushions the downward impact force of the guide core, reducing the generation of noise, which is close to being silent. When the pressing on the guide core is released so that the guide core moves up and resets to the initial state, it directly contacts the upper cover on the upper elastically deformable silencing member which cushions the impact force of the guide core moving upwards to be reset, reducing the generation of noise, which is close to being silent, thereby facilitating achieving the effect of silencing.

The above mentioned is an overview of the technical scheme of the utility model. The following is a further explanation of the utility model in combination with the attached drawings and specific implementations.

DETAILED DESCRIPTION OF THE UTILITY MODEL

In order to further explain the technical means and effect, of the present utility model for achieving the intended purpose, the following detailed description of the embodiments of the present utility model will be made with reference to the accompanying drawings and preferred embodiments.

Figure 1:
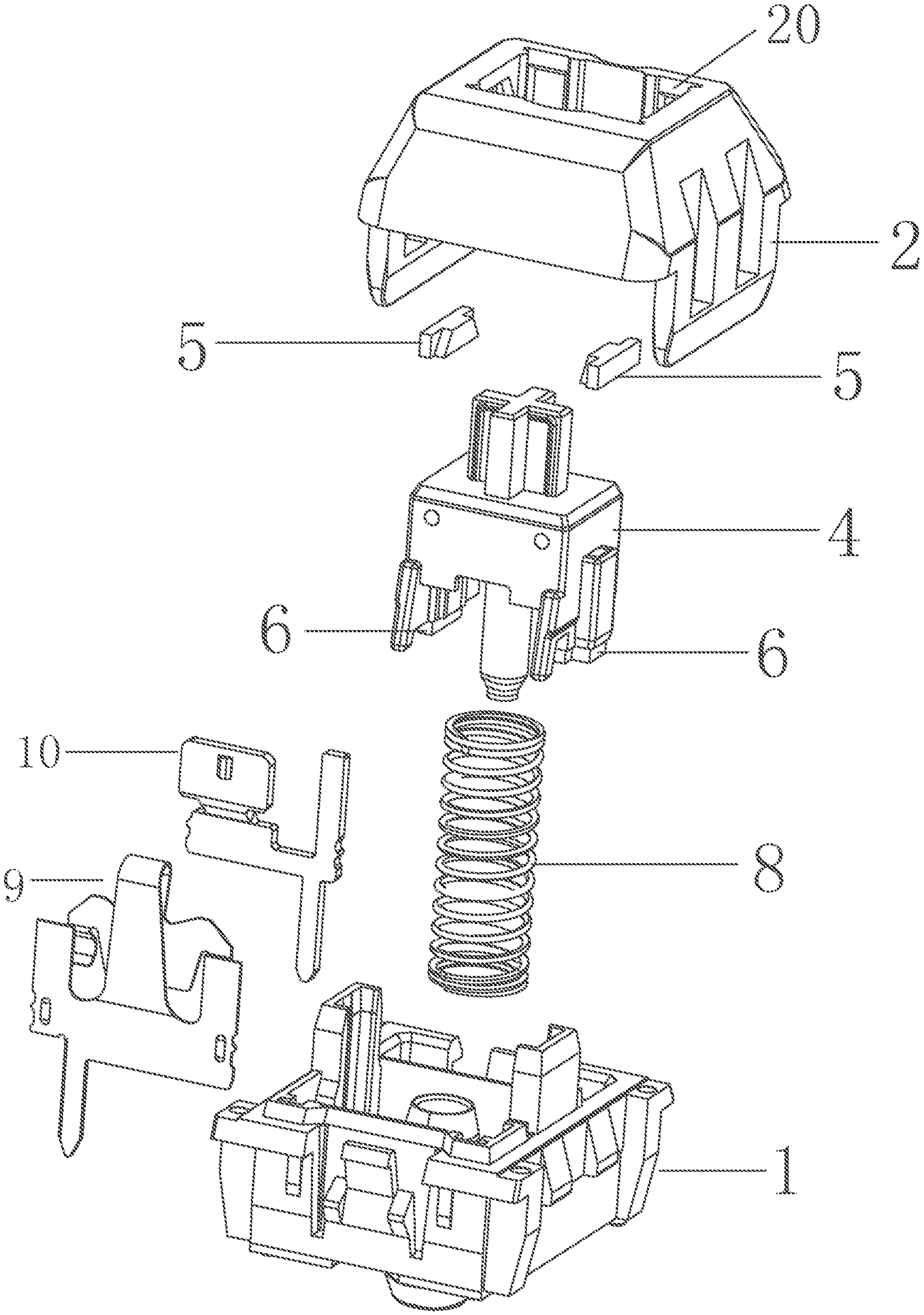
FIG. 1 is an exploded view of the utility model.
Figure 2:
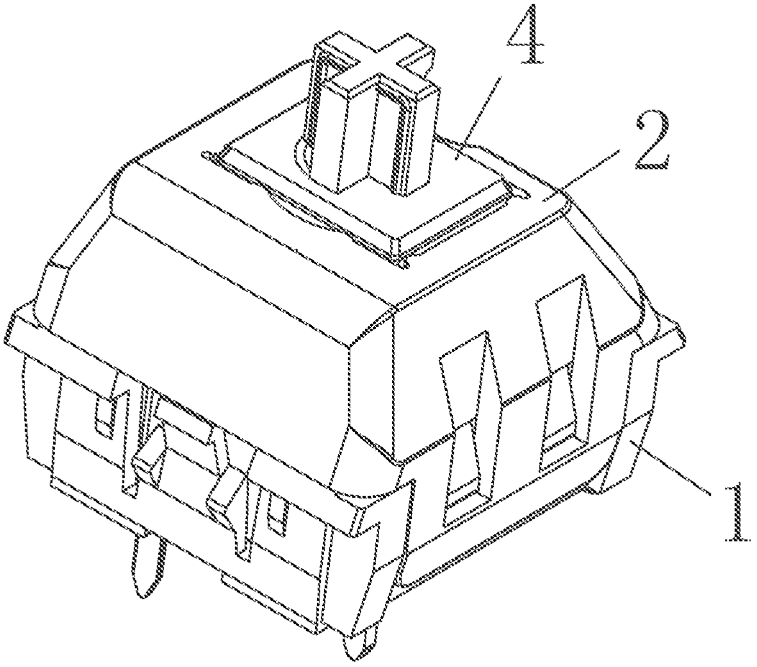
FIG. 2 is a schematic view of the external structure of the utility model.
Figure 3:
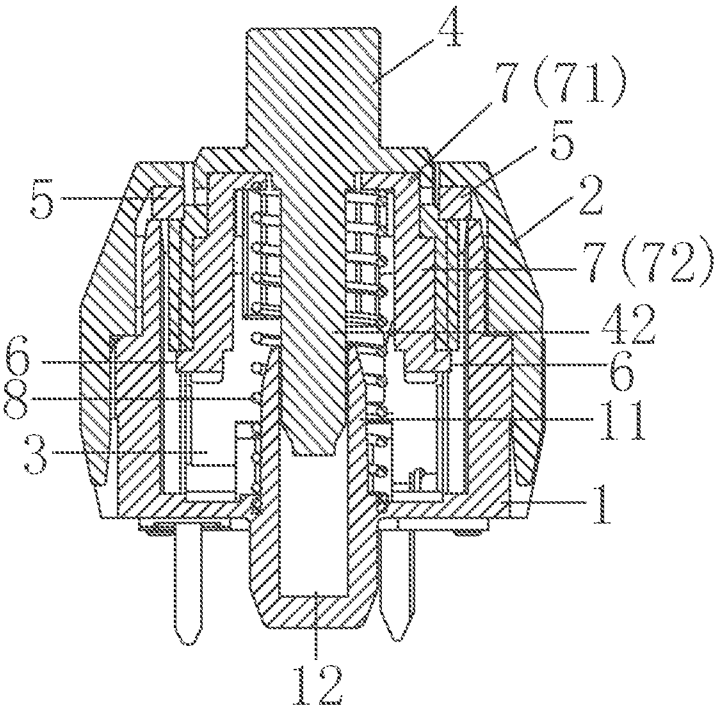
FIG. 3 is a sectional view of the utility model.

With reference to FIGS. 1 to 3, the embodiment of the present utility model provides a combined mute switch, including a base 1 and an upper cover 2 arranged above the base 1. An accommodating cavity is formed in the combination of the upper cover 2 and the base 1. A guide core 4 is arranged in the accommodating cavity 3. At the same time, an opening 20 for an upper end of the guide core 4 to pass out and press is provided on the upper cover 2.

In the present embodiment, at least one upper elastically deformable silencing member 5 is arranged on the upper cover 2 and on a top wall of the accommodating, cavity 3. At least one lower elastically deformable silencing member 6 is arranged on the lower end of the guide core 4. An impact force of the guide core 4 moving downward is dampened and silenced by the lower elastically deformable silencing member 6. An impact force of the guide core 4 moving upwards to be reset is dampened and silenced by the upper elastically deformable silencing member 5. In the natural state, the guide core 4 is in contact with the upper elastically deformable silencing member 5. In the working state, the lower elastically deformable silencing member 6 is in contact with a bottom wall of the housing 3. Thus, when the guide core 4 is pressed to move down to the bottom wall of the accommodating cavity 3 to trigger a conductive component inside the switch to be electrically conductive, the switch is in a working state, and the lower elastically deformable silencing member 6 at the lower end of the guide core 4 touches the bottom wall (the base 1) of the accommodating cavity 3, so that the lower elastically deformable silencing member 6 cushions the impact force of the guide core 4 moving down, reducing the generation of noise, which is close to being silent, so as to facilitate achieving the effect of silencing. However, when the pressing on the guide core 4 is released and the guide core 4 moves upwards and resets to the initial state, the guide core 4 directly contacts the upper elastically deformable silencing member 5 on the upper cover 2. The upper elastically deformable silencing member 5 cushions the impact force of the guide core 4 moving upwards to be reset, reducing the generation of noise, which is close to being silent, thereby facilitating achieving the effect of silencing.

There are three ways to combine the upper elastically deformable silencing member 5 with the upper cover 2.

Figure 4:
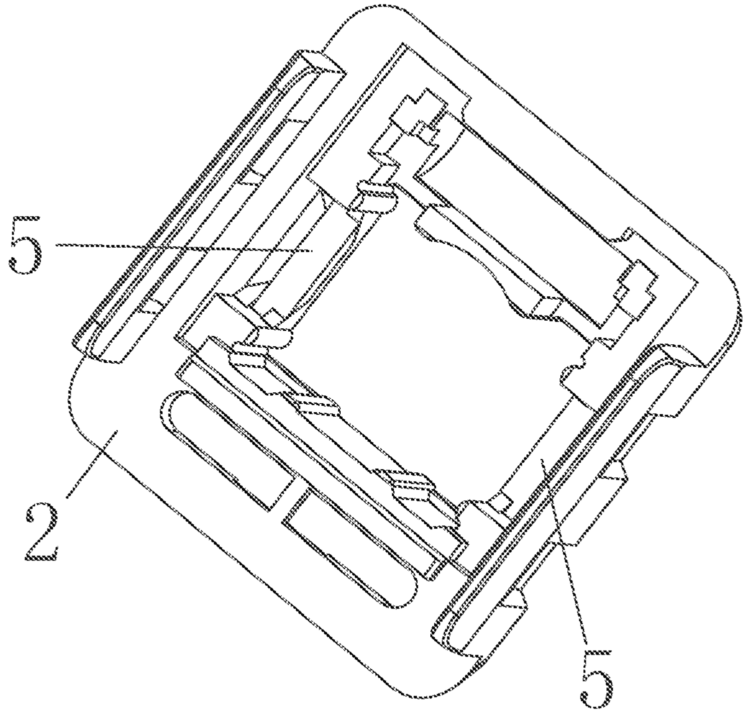
FIG. 4 is a schematic view of a structure of the present utility model in which an upper elastically deformable silencing member is arranged on an upper cover.

(1) The upper elastically deformable silencing member 5 is integrally injection-molded to the upper cover 2 as shown in FIG. 4.

(2) The upper elastically deformable silencing member 5 is adhered to the upper cover 2 as shown in FIG. 4.

Figure 5:
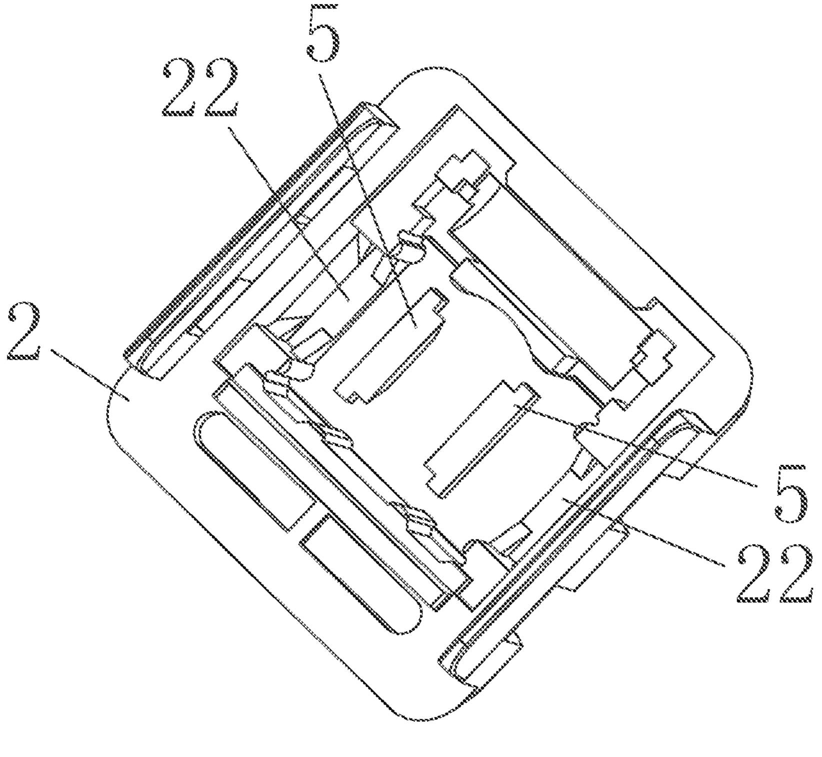
FIG. 5 is a schematic view of the structure of the present utility model in which the upper elastically deformable silencing member is separated from the upper cover.

(3) A clamp slot 22 is formed on the upper cover 2, and the upper elastically deformable silencing member 5 is arranged in the clamp slot 22, as shown in FIG. 5.

Regardless of the manner in which the upper elastically deformable silencing member 5 is combined with the upper cover 2, if it directly contacts the upper elastically deformable silencing member 5 when the guide core 4 is moved upwards and reset to the top wall of the accommodating cavity 3, the function of cushioning and reducing sound can be achieved for the effect of silencing.

Specifically, the upper elastically deformable silencing members 5 has the number of two on opposite sides. Thus, the impact force when the guide core 4 is moved upward and reset can be cushioned from both sides of the guide core 4.

There are three ways to combine the lower elastically deformable silencing member 6 with the guide core 4.

(1) The lower elastically deformable silencing member 6 is adhered to the lower end of the guide core 4.

(2) The lower elastically deformable silencing member 6 is clamped at the lower end of the guide core 4.

Figure 6:
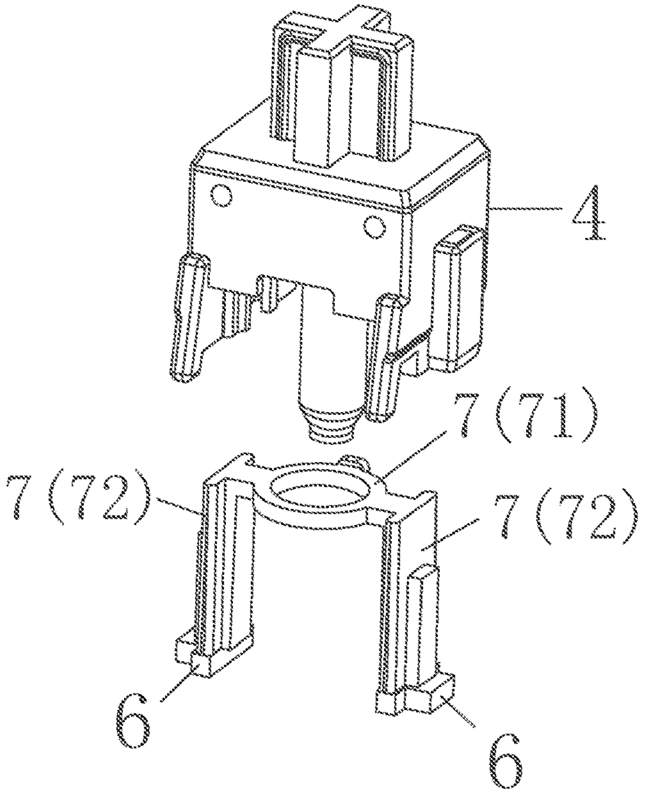
FIG. 6 is an exploded view of a mute buffer and a guide core in the present utility model.
Figure 7:
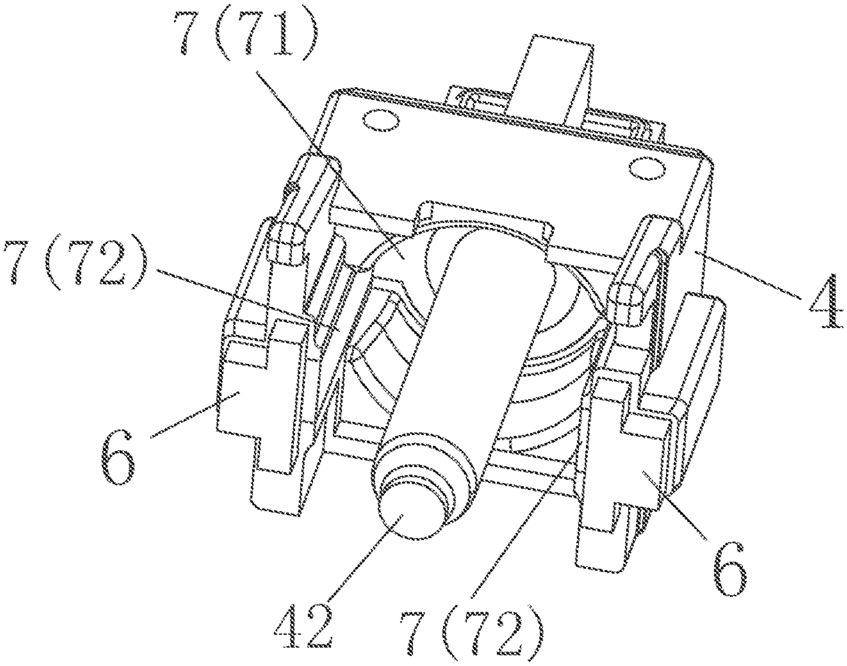
FIG. 7 is a schematic view of the structure in which the mute buffer is arranged on the guide core in the utility model.
Figure 8:
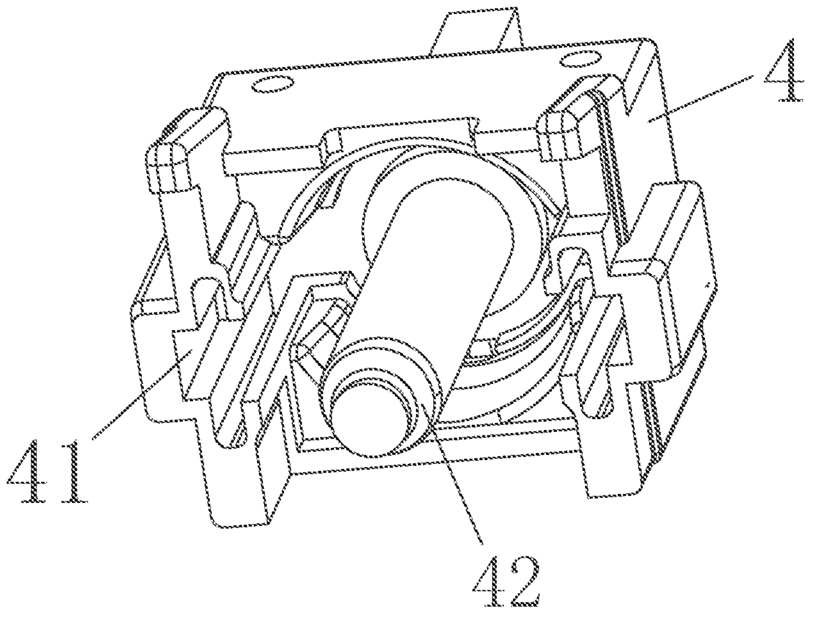
FIG. 8 is a schematic view of the structure of a guide core in the utility model.

(3) As shown in FIGS. 6 to 8, a chamber 41 is reserved in the guide core 4. A mute buffer 7 is integrally injection-molded in the chamber 41. The mute buffer 7 is exposed from the lower end of the guide core 4 to form the lower elastically deformable silencing member 6. Specifically, the mute buffer 7 is mainly composed of a central ferrule 72, two mute bars 72 oppositely connected to both sides of the central ferrule 71, and two lower elastically deformable silencing members 6 respectively connected to lower ends of the two mute bars 72.

Regardless of the manner in which the lower elastically deformable silencing member 6 is combined with the guide core 4, if the lower elastically deformable silencing member 6 directly contacts the bottom wall of the accommodating cavity 3 (the base 1) when the guide core 4 moves down to the bottom wall of the accommodating cavity 3, it can achieve the function of cushioning and reducing sound so as to achieve a sound-deadening effect.

With regard to the above-mentioned mode (3), in the present embodiment, a guide post 11 protrudes upwards on the base 1, and a guide hole 12 is formed in the direction of the central axis of the guide post 11. The lower end of the guide core 4 extends downwards and is provided with a plug shaft 42 inserted into the guide hole 12. The central ferrule 71 surrounds the periphery of the plug shaft 42. A return spring 8 is sheathed on the periphery of the plug shaft 42. The upper end of the return spring 8 contacts with the central ferrule 71. The return spring 8 provides an elastic restoring force for the upward reset of the guide core 4. At the same time, under the action of the elastic restoring force of the return, spring 8, the guide core 4 in a pressed state can be driven to move upward and reset. During the downward movement and upward movement of the guide core 4, the upper end of the return spring 8 touches the central ferrule 71 of the mute buffer 7. Therefore, in the whole process, the impact force between the return spring 8 and the guide core 4 is cushioned by the central ferrule 71 to reduce the generation of wise, which is close to being silent, so as to facilitate achieving the effect of silencing.

In order to further reduce the sound generated during the pressing, the plug shaft 42 at the lower end of the guide core 4 may be made shorter to prevent the plug shaft 42 from impacting against the bottom of the guide hole 12 to generate sound when the guide core 4 moves downwards. The length of the plug shaft 42 is so designed that the plug shaft 42 can move upwards and downwards in the guide hole 12 during the up and down movement of the guide core 4.

In the present embodiment, the upper elastically deformable silencing member 5, both the lower elastically deformable silencing member 6 and the mute buffer 7 are flexible glues which can play a very good sound-deadening function.

In the present embodiment, with regard to the conduction component structure of the switch, a movable and stationary piece structure, a light-conducting structure, a magnetic conduction structure, a Hall conduction structure, etc. in a conventional key switch in the art can be used. The conduction component structure of the present embodiment is described below by taking the movable and stationary plate structure as an example.

Figure 9:
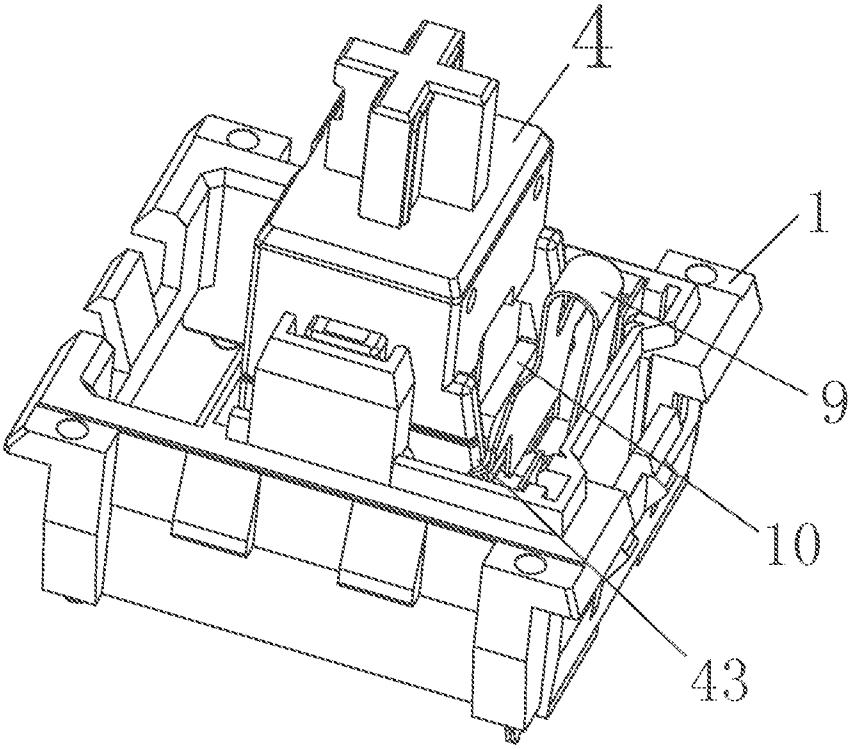
FIG. 9 is a schematic view of a part of the structure of the utility model.

As shown in FIGS. 1 and 9, a movable piece 9 and a stationary piece 10 are provided on the base 1 and located in the accommodating cavity 3. When the guide core 4 is in a natural non-pressed state, the movable piece 9 is pushed outwards by a pressing block 43 on a side of the guide core 4, so that the movable contact on the movable piece 9 is separated from the stationary contact on the stationary piece 10, so as to achieve the disconnection function. However, when the guide core 4 moves downwards, the pressing block 43 on a side of the guide core 4 releases an outward force on the movable piece 9, so that the movable piece 9 is reset close to the stationary piece 10 and, the movable contact on, the movable piece 9 contacts the stationary contact on the stationary piece 10 so as to achieve the conduction function.

In the description above, only the preferred embodiments of the utility model has been described, and the technical scope of the utility model is not limited in any way. Therefore, other structures obtained by adopting the same or similar technical features as those of the above embodiments of the utility model are within the scope of the utility model.

What is claimed is:

1. A combined mute switch, comprising a base and an upper cover arranged above the base, an accommodating cavity being formed in a combination of the upper cover and the base, a guide core being arranged in the accommodating cavity, wherein at least one upper elastically deformable silencing member is arranged on the upper cover and on a top wall of the accommodating cavity; at least one lower elastically deformable silencing member is arranged on a lower end of the guide core; an impact force of the guide core moving downwards is damped and silenced by the at least one lower elastically deformable silencing member; and an impact force of the guide core moving upwards to be reset is damped and silenced by the at least one upper elastically deformable silencing member; wherein a chamber is reserved in the guide core; a mute buffer is integrally injection-molded in the chamber; and the mute buffer is exposed from the lower end of the guide core to form the at least one lower elastically deformable silencing member.

2. The combined mute switch according to claim 1, wherein in a natural state, the guide core is in contact with the at least one upper elastically deformable silencing member; and in a working state, the at least one lower elastically deformable silencing member is in contact with a bottom wall of the accommodating cavity.

3. The combined mute switch according to claim 1, wherein the at least one upper elastically deformable silencing member is integrally injection-molded or adhered to the upper cover.

4. The combined mute switch according to claim 1, wherein a clamp slot is formed on the upper cover; and the at least one upper elastically deformable silencing member is arranged in the clamp slot.

5. The combined mute switch according to claim 1, wherein the combined mute switch comprises two upper elastically deformable silencing members on opposite sides.

6. The combined mute switch according to claim 1, wherein the mute buffer is composed of a central ferrule, two mute bars oppositely connected to both sides of the central ferrule, and two lower elastically deformable silencing members respectively connected to lower ends of the two mute bars.

7. The combined mute switch according to claim 6, wherein a guide post protrudes upwards on the base, and a guide hole is formed in the direction of the central axis of the guide post; the lower end of the guide core extends downwards and is provided with a plug shaft inserted into the guide hole; the central ferrule surrounds a periphery of the plug shaft; a return spring is sheathed on the periphery of the plug shaft; and an upper end of the return spring contacts the central ferrule.

8. The combined mute switch according to claim 1, wherein the at least one lower elastically deformable silencing member is adhered or clamped to the lower end of the guide core.

9. The combined mute switch according to claim 1, wherein the at least one upper elastically deformable silencing member and the at least one lower elastically deformable silencing member are both flexible glue.

* * * * *